United States Patent Office 3,171,823
Patented Mar. 2, 1965

3,171,823
MOLDING COMPOSITION
Thomas E. Murphy, Detroit, and Sidney L. Reegen, Oak Park, Mich., assignors to General Motors Corporation, Detroit, Mich., a corporation of Delaware
No Drawing. Filed Dec. 30, 1960, Ser. No. 79,519
7 Claims. (Cl. 260—22)

This invention relates to a synthetic resin molding composition and more particularly to a synthetic resin molding composition having particular usefulness in the are of modeling and the manufacture of models, patterns and the like.

The manufacture of metal articles by most conventional foundry procedures begins with the hand building of the model of the article to be cast. The production of new products regardless of the method of their manufacture frequently involves the initial step of hand building or sculpturing a model of the new product to be manufactured to better enable the manufacturer to evaluate the aesthetic aspects of the new product and for other purposes. Conventional practice involves sculpuring the models of wood or modeling clays. The sculpturing of models from wood is, of course time consuming and difficut, particularly when large models are used such as, for example, life-size automobile bodies. Modeling clays having good modeling properties which are in principal use today have the basic disadvantage of being readily subject to indentation or damage from mere handling since these clays are not hardenable.

It is the basic object of this invention to provide a molding material which may be readily sculptured by conventional sculpturing instruments at room temperatures and which may be subsequently hardened without appreciable shrinkage to provide the finished model with a high degree of permanence and handleability. It is a further object of this invention to provide a synthetic resin molding material which has good sculpturing properties at room temperatures, which is hand formable at slightly elevated temperatures ranging from about 100° F. to 140° F., and which may be fused after modeling to form a relatively hard, handleable model or pattern of vinyl resin.

These and other objects of the invention are accomplished by admixing a dispersion of a vinyl resin such as polyvinyl chloride in a plastisol-grade plasticizer with certain proportions of an ordinary filler, a thixotropic filler and a combination of beeswax and castor oil. A preferred modeling composition in accordance with this invention is as follows:

| | Parts by weight |
|---|---|
| Polyvinyl chloride | 100 |
| Polyester plasticizer | 100 |
| Barium sulfate | 100 |
| Silica | 25 |
| Carbon black | .05 |
| Dibasic lead phosphite | 5 |
| Beeswax | 25 |
| Castor oil | 25 |

In this composition the plasticizer serves as a dispersing medium for the polyvinyl chloride and also the same function as does the suual plasticizer in the conventional vinyl plastisol which is well known in the art. In short, the vinyl resin is not appreciably soluble in the plasticizer at room temperatures but soluble at elevated fusion temperatures whereby the vinyl composition may be molded while it is a dispersion and then formed into a hard mass by heating the dispersion to its fusion temperature to effect solution of the resin and the plasticizer. The barium sulfate serves the function of a conventional filler. The silica serves as a thixotropic filler or gelling agent which enables the molding composition to be heated to the fusion temperature of the resin without appreciable distortion. The castor oil provides the composition with workability or moldability at a lower temperature than does the beeswax alone which has a melting point of about 149° F. On the other hand, the castor oil alone yields a crumbly, non-adhesive product. In addition, the beeswax provides the composition with a high degree of cohesiveness which is needed in the modeling process. The dibasic lead phosphite as is well known in vinyl compositions serves as a stabilizer whereas the carbon black serves the function of a dye or coloring medium.

The modeling composition of this invention is preferably prepared as follows. First, the polyvinyl chloride, the barium sulfate filler, the dibasic lead phosphite and the carbon black are thoroughly mixed in a Baker-Perkins mill at room temperature in a dry particulate state. After these materials have been milled to a uniform composition, a period of about 15 minutes, the plasticizer is added. Meanwhile, the beeswax is melted and mixed together with the castor oil to form a homogeneous solid. This wax and oil mixture is then added to the aforementioned ingredients and the mixing is continued for about another 30 minutes. Finally, the silica is added and the mixing is continued for another 15 minutes. In the mixing process the temperature of the mixture rises to about 125° F. At this temperature the ingredients are mixed to form a substance having a dough-like consistency.

On cooling to room temperature, the resulting composition is a relatively hard substance resembling dry molding clay which may be easily worked with sharp sculptor's tools. When this substance is heated to a slightly elevated temperature of about 100° F. to 140° F. which is relatively comfortable to the touch, the modeling composition becomes sufficiently soft to be hand molded. After the forming or molding work is completed, this composition may be fused or cured by heating it to a temperature in the range of about 320° F. to 360° F. for a period of time from a few minutes up to about twelve hours depending on the volume of the molded article to obtain a relatively hard polyvinyl chloride resin model.

The molding composition may be conveniently employed in making a model as follows. A mass of the above-described composition such as is removed from the mixing mill or heated to a temperature in the range of about 100° F. to 140° F. is placed on a sculpturing table and the article to be formed is molded by a conventional hand forming operation. The roughly formed model is then permitted to cool to room temperature. At this temperature, as indicated above, the molding material is a relatively hard substance which requires the use of sharp sculptor's tools. In this condition the fine details may be carved or otherwise formed in the model. After the forming work has been completed, the model is then heated to a temperature in the vicinity of 350° F. to cause the material to fuse and form a relatively tough, handleable model.

Preferably the synthetic resin component of the molding composition is a relatively high molecular weight plastisol-grade polyvinyl chloride resin having a specific viscosity of 0.50 to 0.55 when measured as a 0.4% nitrobenezen solution at 86° F. and a particle size of about 1 to 5 microns in diameter. Useful molding compositions may be prepared in accordance with this invention in which the polyvinyl chloride is varied in a range of about 90 to 110 parts by weight. Other resins such as the copolymer of vinyl chloride and vinyl acetate may be used in some instances with satisfactory results.

The plasticizer is preferably of the polymeric polyester type which has a molecular weight of about 6000 and a viscosity at 77° F. of about 2700 poises. Illustrative of a satisfactory plasticizer is one having the aforementioned viscosity and approximate molecular weight which is formed as a reaction product of adipic acid and butane diol or 1,3 propane diol. Satisfactory molding compositions may be made employing polyester plasticizers having a viscosity range of from 2000 to 10,000 poises. Satisfactory molding compositions include those in which the plasticizer is varied in the proportion of about 65 to 110 parts by weight.

The preferred filler material as above indicated is barium sulfate. Satisfactory molding compositions may be prepared by varying the proportion of this filler from about 90 to 110 parts by weight. Other fillers such as carbon black, clays, diatomaceous earth and calcium carbonate may be substituted for the barium sulfate in suitable proportions.

As above indicated, an essential aspect of the molding composition of this invention is the presence therein of a thixotropic filler which permits the molding composition to be heated from its sculptured condition at room temperature to its fusion temperature in the range of 320° F. to 360° F. without appreciable flow or distortion so that the formed characteristics of the model are preserved in the hard permanent condition thereof. Satisfactory molding compositions may be formed in which the silica is present in the range of from 15 to 40 parts by weight.

Other thixotropic fillers such as Bentone (dimethyldioctadecyl ammonium salt of montmorillonite) may be used in place of the silica in similar amounts. Suitable mixtures of these fillers may also be used if desired. The Bentone may be used in proportions of about 6 parts by weight. As indicated above, it is necessary to use only as much thixotropic filler as is required to prevent the composition from flowing as it is heated to the fusion temperature of about 350° F. of the composition. The carbon black, when used to provide the molding composition with a dark color, may be used in any desired proportion provided that this amount, when added to the total filler content, does not appreciably exceed the filler limits set forth above.

The dibasic lead phosphite serves as a stabilizer and may be used in the range of about 3 to 7 parts by weight with satisfactory results. In some instances, it may be desirable to employ as much as 15 parts of this stabilizer to provide a molding mixture with suitably stabilized physical properties.

The combined beeswax and the castor oil may be varied in proportions from about 30 to 65 parts by weight. The ratio of the beeswax to the castor oil is preferably between 0.5:1 to 3:1. As previously indicated, the beeswax is essential to provide the composition with a high degree of cohesiveness while the castor oil is necessary to provide the composition with workability at the lower molding temperatures. Other vegetable oils may be used in place of the castor oil. Mineral oils may also be used. The latter oils are not preferred since they tend to bleed from the modeling composition at elevated temperatures. Paraffin (melting point 131° F.) or other low melting point waxes may be used in place of the castor oil. Vegetable waxes or synthetic waxes having cohesion-providing properties and melting points similar to that of beeswax may be substituted in place of the beeswax.

It will be understood that the ingredients of the composition of this invention may be varied over a considerable range to provide useful molding compositions of value for a variety of applications such as modeling, pattern making and in some instances, the manufacture of molds and dies.

While the embodiments of the invention as described herein constitute preferred forms, others may be adopted within the spirit of the invention.

We claim:
1. A solid moldable composition hand workable in a temperature range of about 100° F. to 140° F. comprising 90 to 110 parts by weight of a vinyl resin taken from the group consisting of polyvinyl chloride and polyvinyl acetate, 65 to 110 parts by weight of a polyester plasticizer having a viscosity of from about 2,000 to 10,000 poises measured at 77° F., 105 to 150 parts by weight of a filler including 15 to 40 parts by weight of a thixotropic filler, and 30 to 65 parts by weight of beeswax plus castor oil, the proportion of beeswax to castor oil being in a ratio of about 0.5:1 to 3:1.

2. A solid moldable composition hand workable in a temperature range of about 100° F. to 140° F. comprising 90 to 110 parts by weight of a vinyl resin taken from the group consisting of polyvinyl chloride and polyvinyl acetate, 65 to 110 parts by weight of a polyester plasticizer having a viscosity of from about 2,000 to 10,000 poises measured at 77° F., 105 to 150 parts by weight of a filler including about 15 to 40 parts by weight of a thixotropic filler, and 30 to 65 parts by weight of beeswax plus a compound taken from the group consisting of paraffin wax and castor oil, the proportion of beeswax to said compound being in a ratio of about 0.5:1 to 3:1.

3. A solid modeling composition comprising 90 to 110 parts by weight of a vinyl resin taken from the group consisting of polyvinyl chloride and polyvinyl acetate, 65 to 110 parts by weight of a polyester plasticizer having a viscosity of from about 2,000 to 10,000 poises measured at 77° F., 105 to 150 parts by weight of a filler including 15 to 40 parts by weight of a thixotropic filler, 30 to 65 parts by weight of beeswax plus castor oil, the proportion of beeswax to castor oil being in a ratio of about 0.5:1 to 3:1, and 3 to 15 parts by weight of dibasic lead phosphite, said composition being adapted to be sculptured at room temperature, hand molded at about 100° F. to 140° F. and fusible at about 320° F. to 360° F.

4. A solid molding composition comprising about 90 to 110 parts by weight of polyvinyl chloride resin, about 65 to 110 parts by weight of a polyester plasticizer having a viscosity of from about 2,000 to 10,000 poises measured at 77° F., about 105 to 150 parts by weight of a filler including about 15 to 40 parts by weight of a thixotropic silica filler, about 30 to 65 parts by weight of beeswax plus castor oil, the proportion of beeswax to castor oil being in a ratio of about 0.5:1 to 3:1, the proportion of beeswax being sufficient to render the composition cohesive, and the proportion of castor oil being sufficient to render the composition hand moldable between 100° F. and 140° F.

5. A solid moldable composition hand workable in a temperature range of about 100° to 140° F. comprising 90 to 110 parts by weight of a vinyl resin taken from the group consisting of polyvinyl chloride and polyvinyl acetate having a specific viscosity of 0.50 to 0.55 when measured as a 0.4% nitrobenzene solution at 86° F., 65 to 110 parts by weight of a polyester plasticizer having a viscosity of about 2,000 to 10,000 poises measured at 77° F., said polyester being the reaction product of adipic acid and a diol taken from the group consisting of butanediol and 1,3 propanediol, 105 to 150 parts by weight of a filler including 15 to 40 parts by weight of a thixotropic filler and 30 to 65 parts by weight of beeswax plus castor oil, the proportion of beeswax to castor oil being in a ratio of about 0.5:1 to 3:1.

6. A method of making a model comprising the steps of mixing and heating to a temperature in the range of about 100° F. to 140° F. a composition comprising 90 to 110 parts by weight of a vinyl resin taken from the group consisting of polyvinyl chloride and polyvinyl acetate, 65 to 110 parts by weight of a polyester plasticizer having a viscosity of from about 2,000 to 10,000 poises measured at 77° F., 105 to 150 parts by weight of a filler including about 15 to 40 parts by weight of a thixotropic filler and 30 to 65 parts by weight of beeswax and a compound taken from the group consisting of paraffin wax and castor oil, the proportion of beeswax to said compound being in a ratio of 0.5:1 to 3:1, hand molding said composition to a mass of the approximate shape ultimately desired at said temperature, permitting said mass to cool to room temperature and further sculpturing said mass and finally heating said mass to a temperature in the range of 320° F. to 360° F. for a time sufficient to effect a fusion of said resin composition.

7. A method of making a model comprising the steps of mixing and heating to a temperature in the range of about 100° F. to 140° F. a composition comprising 90 to 110 parts by weight of a polyvinyl chloride resin having a specific viscosity of 0.50 to 0.55 when measured as a 0.4% nitrobenzene solution at 86° F., 65 to 110 parts by weight of a polyester plasticizer having a viscosity of about 2,000 to 10,000 poises measured at 77° F., 105 to 150 parts by weight of a filler including about 15 to 40 parts by weight of a thixotropic filler and 30 to 65 parts by weight of beeswax and castor oil, the proportion of beeswax to castor oil being in a ratio of 0.5:1 to 3:1, hand molding said composition to a mass of the approximate shape ultimately desired at said temperature, permitting said composition to cool to room temperature and further sculpturing said mass and finally heating said mass to a temperature in the range of 320° F. to 360° F. for a time sufficient to effect a fusion of said resin.

References Cited by the Examiner
UNITED STATES PATENTS

| | | | |
|---|---|---|---|
| 2,414,399 | 1/47 | Sorg | 260—23 X |
| 2,525,177 | 10/50 | Lockwood | 260—23 X |
| 2,528,507 | 11/50 | Foye | 260—23 X |
| 2,603,612 | 7/52 | Elissabide | 260—23 X |
| 2,723,962 | 11/55 | Hedges et al. | 260—22 |
| 2,834,052 | 5/58 | Hunn | 18—47.5 |
| 2,956,902 | 10/60 | Greif | 260—22 |

LEON J. BERCOVITZ, *Primary Examiner.*

A. D. SULLIVAN, *Examiner.*